(12) United States Patent
Christ et al.

(10) Patent No.: US 8,489,228 B2
(45) Date of Patent: Jul. 16, 2013

(54) PATH PLANNING IN A WAREHOUSE

(75) Inventors: Thomas Christ, Kronau (DE); Christian Reinhardt, Heidelberg (DE)

(73) Assignee: SAP AG, Walldorf (DE)

( * ) Notice: Subject to any disclaimer, the term of this patent is extended or adjusted under 35 U.S.C. 154(b) by 1092 days.

(21) Appl. No.: 11/793,955

(22) PCT Filed: Dec. 29, 2004

(86) PCT No.: PCT/EP2004/053728
§ 371 (c)(1), (2), (4) Date: May 18, 2009

(87) PCT Pub. No.: WO2006/069602
PCT Pub. Date: Jul. 6, 2006

(65) Prior Publication Data
US 2011/0106417 A1 May 5, 2011

(51) Int. Cl.
*G06F 7/00* (2006.01)

(52) U.S. Cl.
USPC ........... 700/214; 700/213; 700/215; 700/216; 700/219

(58) Field of Classification Search
USPC ............... 701/200; 52/174; 705/7.12, 7.26, 705/337, 338, 28; 700/213, 214, 219
See application file for complete search history.

(56) References Cited

U.S. PATENT DOCUMENTS 4,930,640 A * 6/1990 Edwards ............... 211/134
7,243,001 B2 * 7/2007 Janert et al. ........... 700/214

* cited by examiner

*Primary Examiner* — James Trammell
*Assistant Examiner* — Jerrah Edwards
(74) *Attorney, Agent, or Firm* — Blakely Sokoloff Taylor & Zafman, LLP (57) ABSTRACT

A method of path planning for a working resource to access storage bins in a warehouse, the warehouse comprising a plurality of storage bins, the warehouse being divided into a set of activity areas, each activity area comprising a number of the bins of the warehouse; the method comprising the following steps: Selecting one out of a set of activities of a working resource in the warehouse; selecting a sort sequence which is associated with the selected activity, the sort sequence defining a path through the activity area the working resource has to follow when accessing the bins; determining, based on the selected activity area and the selected sort sequence, the path through the activity area to the bins.

17 Claims, 7 Drawing Sheets

FIG. 1

| MDT | LGNUM | AISLE | STACK | LEVEL | BIN SUBDIVISION | DEPTH |
|---|---|---|---|---|---|---|
| 001 | 0001 | A | B | C | D | E |

FIG. 2A

| MDT | LGNUM | LFDNR | LGTYP | SCHAB | STRUK | STAWE | ENDWE | INCRE |
|---|---|---|---|---|---|---|---|---|
| 001 | 0001 | 001 | 0001 | NNCNNCNNC NCCCCCC | AA BB CC D | 01-01-01-A | 02-04-01-A | 01 01 01 |

FIG. 2B

| MDT | LGNUM | LGPLA | LGTYP | AISLE | STACK | LEVEL | BIN SUBDIVISION |
|---|---|---|---|---|---|---|---|
| 001 | 0001 | 01-01-01-A | 0001 | 01 | 01 | 01 | A |
| 001 | 0001 | 01-02-01-A | 0001 | 01 | 02 | 01 | A |
| 001 | 0001 | 01-03-01-A | 0001 | 01 | 03 | 01 | A |
| 001 | 0001 | 01-04-01-A | 0001 | 01 | 04 | 01 | A |
| 001 | 0001 | 02-01-01-A | 0001 | 02 | 01 | 01 | A |
| 001 | 0001 | 02-02-01-A | 0001 | 02 | 02 | 01 | A |
| 001 | 0001 | 02-03-01-A | 0001 | 02 | 03 | 01 | A |
| 001 | 0001 | 02-04-01-A | 0001 | 02 | 04 | 01 | A |

FIG. 2C

| MANDT | LGNUM | RANK | AREA | AISLE SRT | AISLE END | STACK SRT | STACK END | LEVEL SRT | LEVEL END | BINSC SRT | BINSC END |
|---|---|---|---|---|---|---|---|---|---|---|---|
| 001 | 0001 | 01 | 0044 | 01 | 01 | 01 | 04 | 01 | 01 | A | A |
| 001 | 0001 | 02 | 0044 | 02 | 02 | 01 | 04 | 01 | 01 | A | A |

PATH PLANNING IN A WAREHOUSE

This is a non-provisional application of International Application No. PCT/EP2004/053728, filed Dec. 29, 2004.

BACKGROUND OF THE INVENTION

The present invention relates to path planning in a warehouse and to organizing a warehouse, as well as to a warehouse.

STATE OF THE ART

Typically in a warehouse where goods are stored at locations called storage bins, many workers or working resources are active in processing goods. Activities of the workers may comprise picking goods, putting goods away, transferring goods from one location of the warehouse to another location. When executing these activities, the workers or working resources have to go on a path through the warehouse in order to get access to the storage bins.

A path through the warehouse to one or more bins the worker has to access for executing an activity is denoted hereinafter also as a "sort sequence". While the problem of finding a path might be easy in case of a small warehouse where only a few workers are busy at one time, the problem gets difficult in a larger warehouse with many workers being simultaneously busy in executing many different activities.

A common solution to define such a path would include storing it in relation to the respective bin in a database. This approach, however, yields only static paths (or sort sequences) and thus limits the number of paths for a bin.

For instance, during the day, many persons may be working in parallel in the warehouse so that paths have to be shorter, while during the night, only a few persons may be available, so that paths may have a greater length.

SUMMARY OF THE INVENTION

In one aspect, the present invention provides a method of path planning for a working resource to access storage bins in a warehouse, the warehouse comprising a plurality of storage bins, the warehouse being divided into a set of activity areas, each activity area comprising a number of the bins of the warehouse; the method comprising:

Selecting one out of a set of activities of a working resource in the warehouse; selecting a sort sequence which is associated with the selected activity, the sort sequence defining a path through the activity area the working resource has to follow when accessing the bins;

determining, based on the selected activity area and the selected sort sequence, the path through the activity area to the bins.

In a further aspect, the present invention provides a method of organizing a warehouse, the warehouse comprising a plurality of bins for storing goods, the method comprising:

Defining a set of activities of a working resource in the warehouse; defining a set of activity areas, each activity area comprising a number of the storage bins of the warehouse;

associating with each activity a sort sequence, the sort sequence defining a path through an activity area the working resource has to follow when accessing the bins.

In yet a further aspect, the present invention provides a warehouse, comprising a plurality of storage bins, the warehouse being organized in the following way:

A set of activities of a working resource in the warehouse is defined;

a set of activity areas is defined, each activity area comprising a number of the storage bins of the warehouse;

with each activity, a sort sequence is associated, the sort sequence defining a path through the activity area the working resource has to follow when accessing the bins.

Thus, the present invention de-couples the sort sequence from the bin definition. This allows defining different paths through a warehouse according to the different activities. Thus, the present invention allows to define an arbitrary number of paths for each activity.

Advantageous implementations can include one or more of the following features.

The activities may be categorized in picking, putting-away, counting goods stored in bins, replenishment of goods.

Activities may be further categorized according to predefined criteria. These criteria may be at least one of time, daytime, nighttime.

A bin may be defined by at least one of aisle, stack, level, sub-division, and depth.

Position coordinates may be associated to a bin. Then furthermore, a path length on the basis of the coordinates may be associated with bins.

For each activity area, a range of bins may be selected according to a number of predefined attributes.

These attributes may comprise location of the bin in the warehouse, and storage type of the bin.

Furthermore, a start point and an end point may be assigned to an activity area.

A sort sequence may further comprise a picking mode. The picking mode may comprise one of even, odd, even-odd, odd-even.

In particular, the invention comprises also computer systems for performing the inventive methods.

Furthermore, the invention comprises computer-readable storage media comprising program code for performing the inventive methods, when loaded into a computer system.

BRIEF DESCRIPTION OF DRAWINGS

The accompanying drawings, which constitute a part of the specification, illustrate embodiments of the invention, and may serve in connection with the description to explain principles of the invention.

In the drawings:

FIGS. 5-1-5-3 illustrate examples of a picking mode according to the invention;

DETAILED DESCRIPTION

Figure 1:
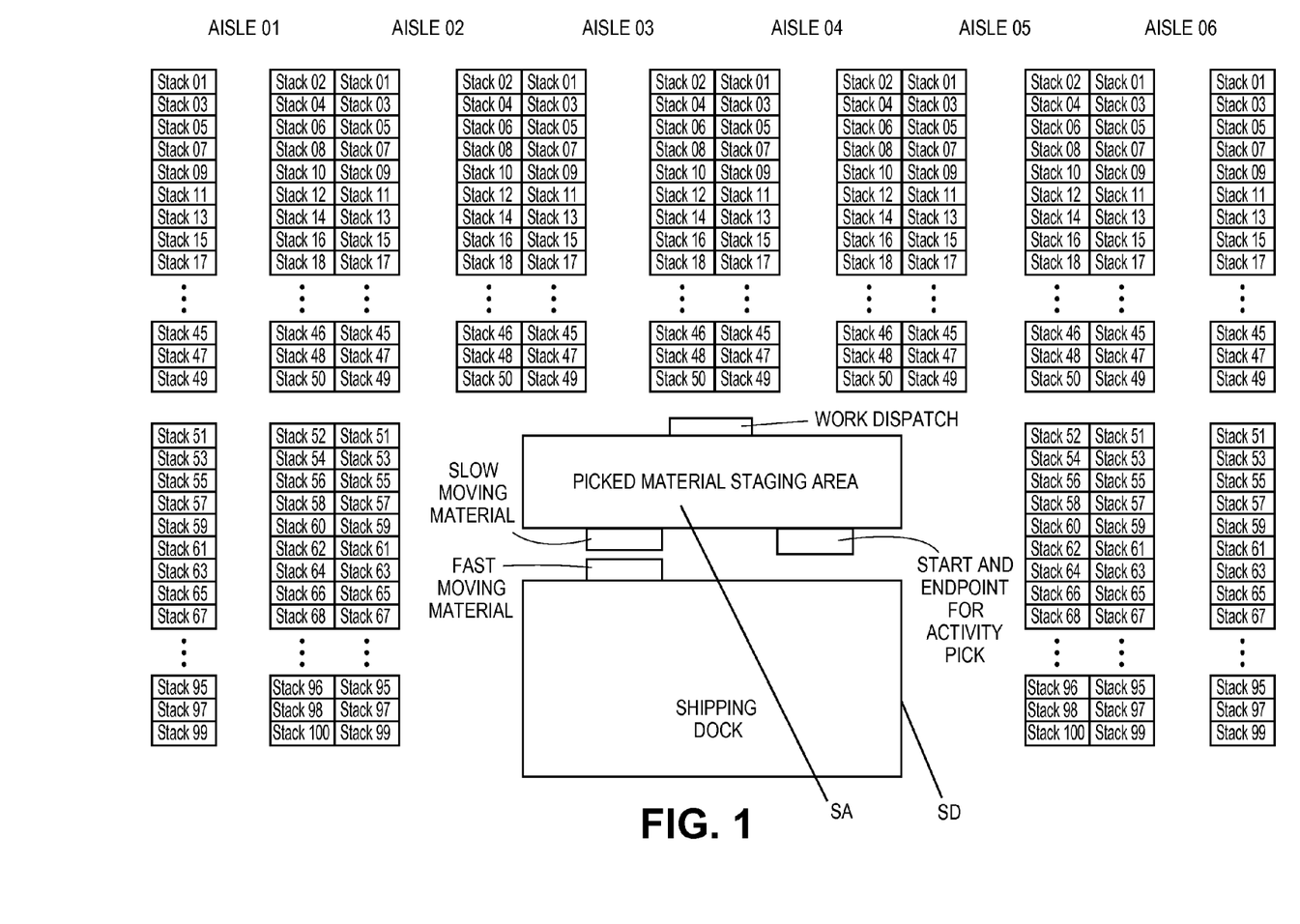
FIG. 1 illustrates a typical floor plan of a warehouse in which the present invention is applied.

The warehouse according to FIG. 1 comprises six aisles 01, 02, 03, 04, 05, 6, each aisle having stacks on the left-hand side and on the right-hand side. Stacks on the left-hand side are odd-numbered while stacks on the right-hand side are even-numbered. At a central location arranged is a shipping dock SD, and between the shipping dock SD and the racks is a staging area SA for temporarily placing the picked goods.

The stacks may have further levels, and the bins on each level may be further divided into bin subdivisions and depth.

Figure 2A:
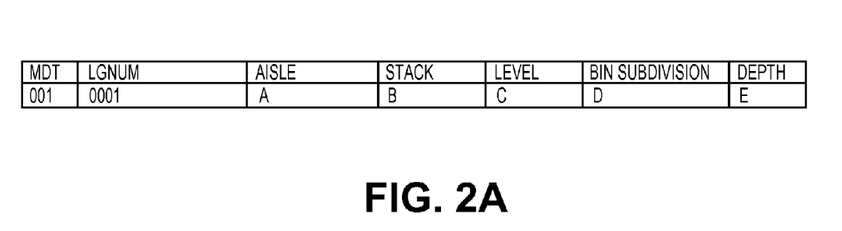
FIGS. 2A-2C illustrate data structures used in the present invention.

Thus, a storage bin may me identified using different parts. These parts are aisle, stack, level, bin-sub-division, and depth. These parts constitute an identifier for the storage bin. The structure of a storage bin has semantic meaning. An indicator for each part of the storage bin identifier may be defined. FIG. 2A shows a corresponding identifier and the indicators. The upper line contains the parts of the bin, the lower line gives the indicators of the respective part in the field just above to form a data set. The first and second columns of the data set identify a customer and the warehouse.

Figure 2B:
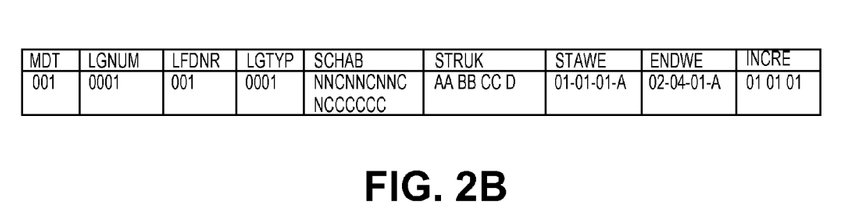

Using the notation above, the bin structure can be defined as illustrated in FIG. 2B. Herein, "AA BB CC D" denotes a structure with two aisles with two stacks each, and each stack having two levels and being subdivided. The first, second, and third columns relate to the customer, the warehouse number, and the warehouse type, respectively. The first bin is denoted by 01-01-01-A, and the end bin with 02-04-01-A.

Figure 2C:
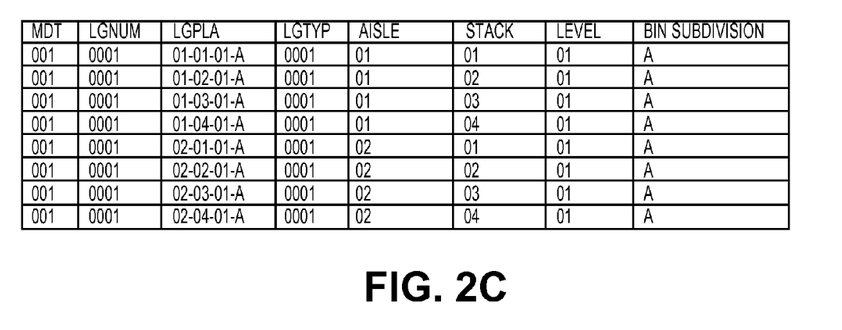

The bins according to the structure of FIG. 2B are given in the table of FIG. 2C.

An exemplary resulting definition of bins in a warehouse is given in FIG. 2C. As can be seen from FIG. 2C, there are four bins in each aisle of aisles A, B, two on the left-hand side, and two on the right-hand side. Furthermore, there are separate fields for each of the defined parts of the storage bins. This information will be used for defining activity area and path.

When defining the storage bins, there is optionally the possibility provided to associate x, y, z-coordinates with each storage bin. The coordinates can be used to form a rough estimation of the length of a determined path.

With the storage bins thus created, activities are defined for the warehouse. The activities may be picking, putting-away, inventory counting in the warehouse. With these activities, path optimization is made. For optimizing the path, the warehouse is divided into several logical parts. These parts are denoted as activity areas. An activity area comprises a number of storage bins. If appropriately numbered, an activity area may comprise an interval of storage bins, whereby the interval is defined by its start and end points for aisle, stack, level, bin-subdivision, and depth. An area may also comprise a whole storage type if there is a one-to-one relation to the activity area.

The assignment of the storage bins to the activity area is based on the bin parts laid out above. The bin name is separated from the assignment of the storage bins to the activity area.

Figure 3A:
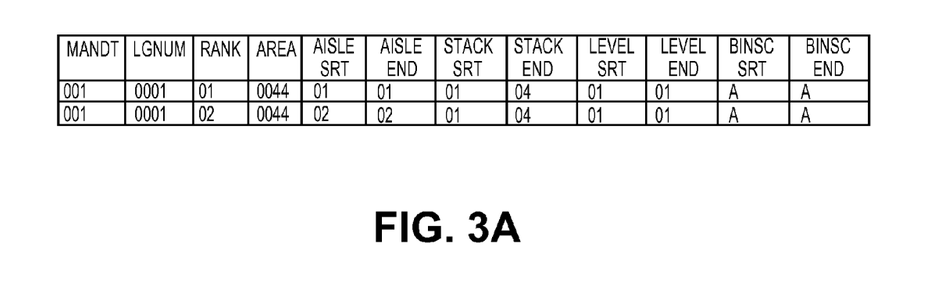
FIGS. 3A-3C illustrate sort sequences the present invention.
Figure 3B:
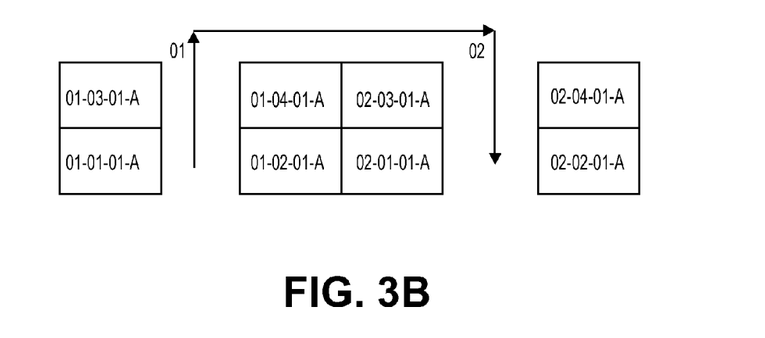
Figure 3C:
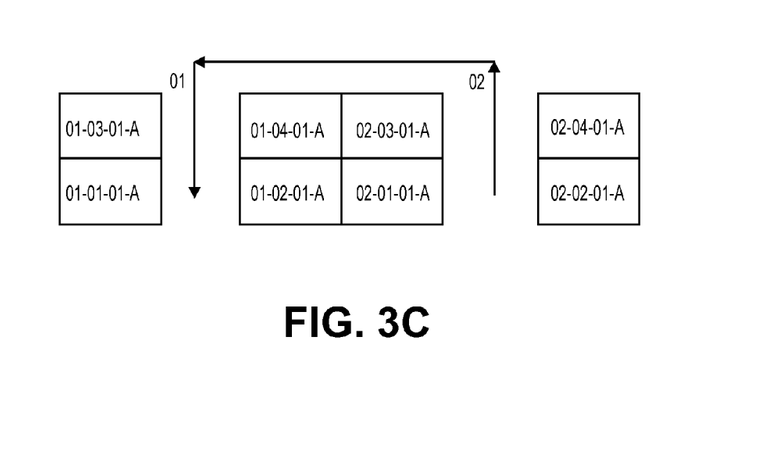

For each activity area, several intervals may be stored divided by a rank. The rank is part of the key. In the example of FIG. 3A, the sequence would first access the bins in aisle 01 and then the bins in aisle 02, see FIG. 3B. If this rank is changed, another sequence is determined. For example, if the rank is just flipped, the sequence would access first the bins in aisle 02 and then the bins in aisle 01, see FIG. 3C.

Within an activity area, the path can be optimized. A further customizing table is used to define the sort direction within the activity area depending on special activities (or processes). Herein, the customer may define the sort direction for every part of the storage bin (aisle, stack, ... ). The directions can be chosen between ascending and descending, see paths 43, 44, in FIG. 4. Furthermore, alternating or not alternating can be stored with each storage bin. Alternating means that the worker has to go in "snake lines" through an aisle, see paths 41, 42 in FIG. 4.

By implementing this disconnection between definition of the area and definition of the sort direction within the activity area, it is possible to define the sort directions depending on a special process such as put-away or picking. This enables also to define different paths for different activities within one activity area. Further, it is possible to define different paths for different times of the day, for example a path for day-picking and another one for night-picking.

With these definitions, a report is started. This calculates the best way based on the defined values and stores it to a data base. Later, different processes will use this path.

Figure 4:
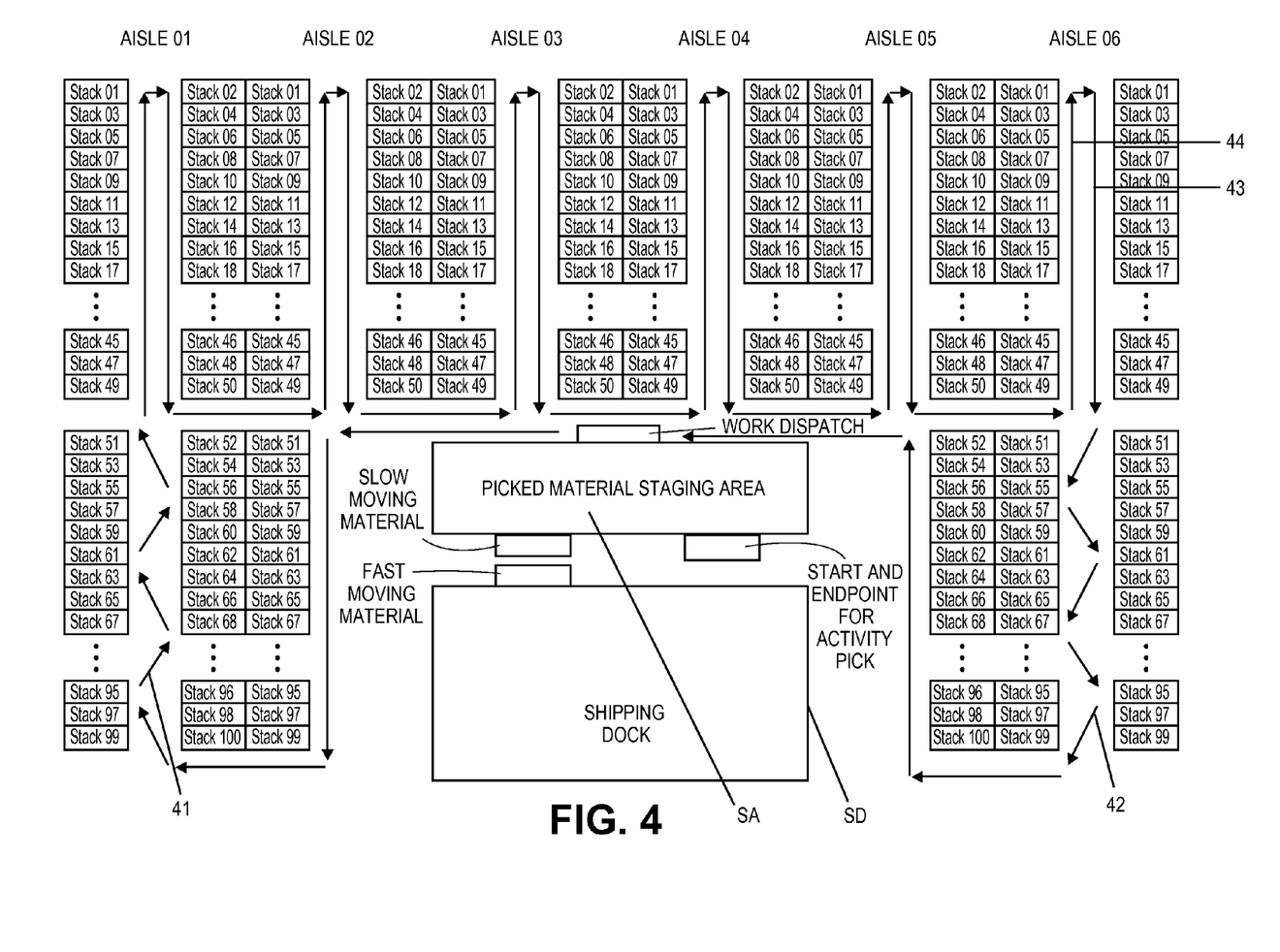
FIG. 4 illustrates paths through an activity area of the warehouse according to the invention.

FIG. 4 illustrates paths through an activity area of the warehouse.

Figure 5:
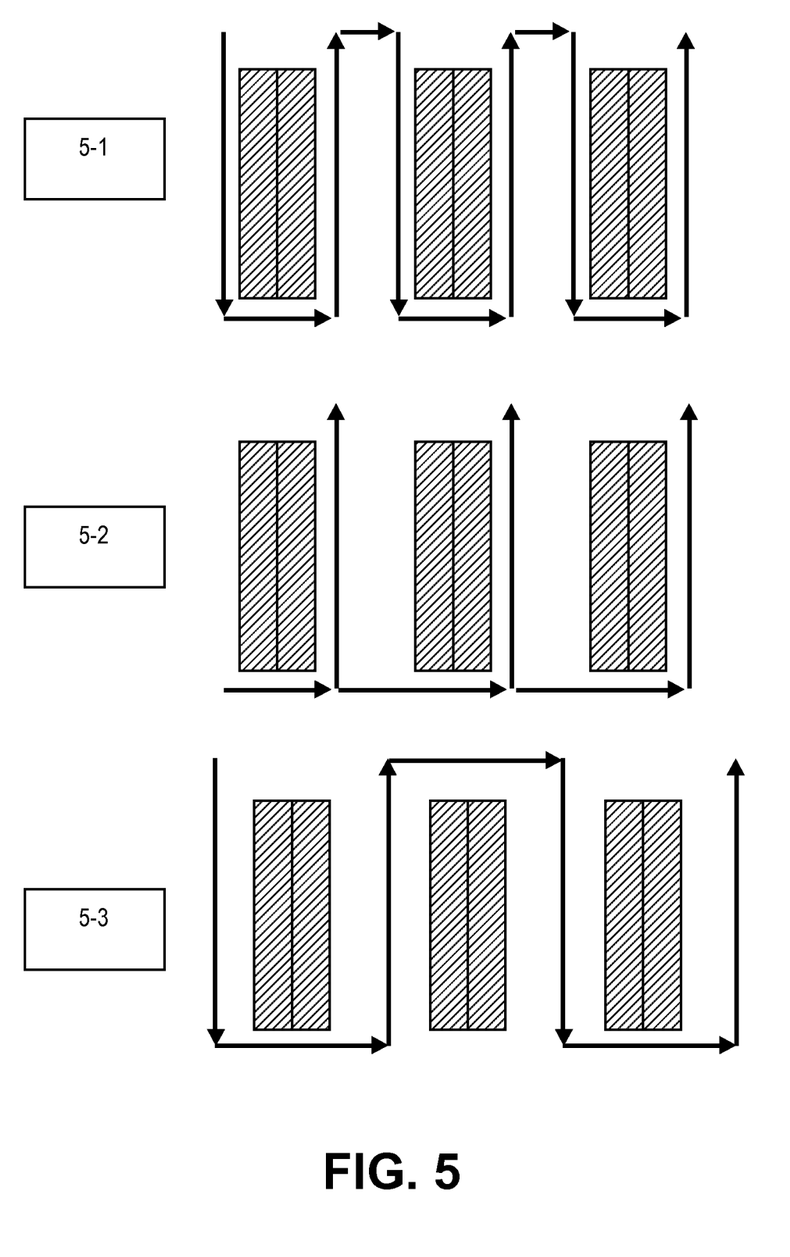

FIG. 5 illustrates three examples of how a picking mode may be set up. The picking mode can be set up in the definition of the sort sequence. This controls which bins are taken into calculation for the sort sequence. This picking mode is dependent on the stack. It can be controlled as only odd, only even, or both even and odd. It controls further in which order these stacks are calculated, e.g., first odd then even.

FIGS. 5-1 shows a sort sequence where first odd, then even bins are sorted (i.e., accessed). FIGS. 5-2 shows a sort sequence where only odd bins are sorted, whereas FIGS. 5-3 shows a sequence where both odd and even bins are sorted. This may be very useful for aisles which have only stacks on one side, and on the other side a wall.

Figure 6:
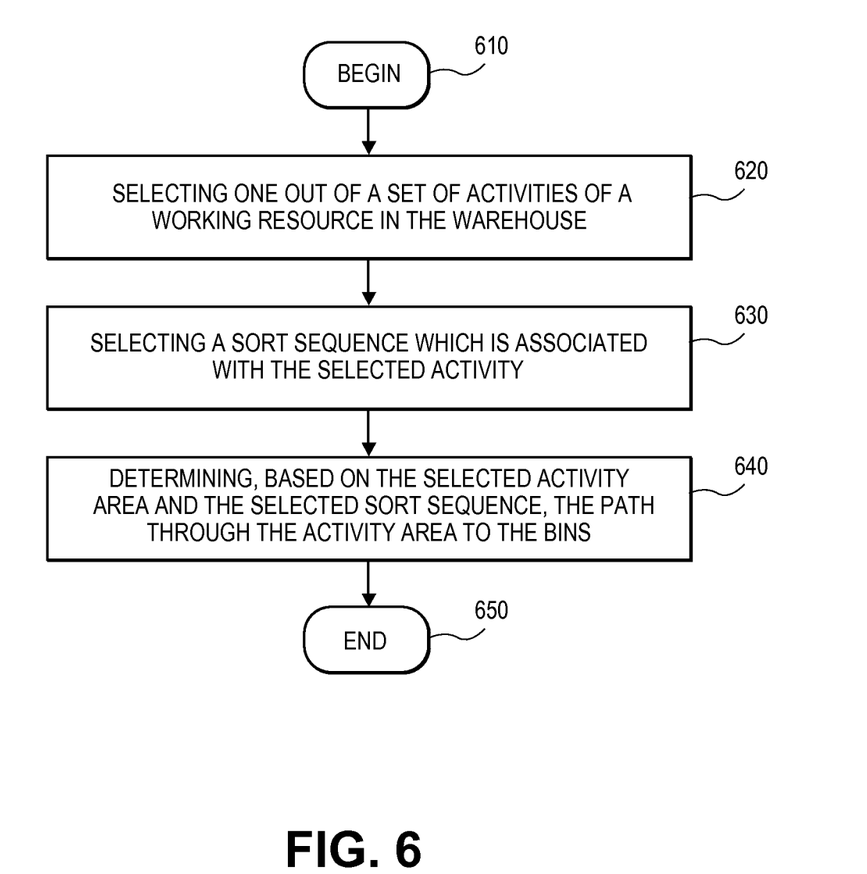
FIG. 6 illustrates a flow diagram of a first embodiment of the invention.

FIG. 6 illustrates the flowchart of the inventive method of planning a path through the warehouse for a working resource which has to access storage bins. The method starts with step 610.

In step 620, one activity is selected out of a set of activities of a working resource in the warehouse.

Then, in step 630, a sort sequence is selected which is associated with the selected activity. The sort sequence defines a path through the activity area the working resource has to follow when accessing the bins.

In step 640, the path through the activity area to the bins is determined, based on the selected activity area and the selected sort sequence.

The path planning method ends with step 650.

Figure 7:
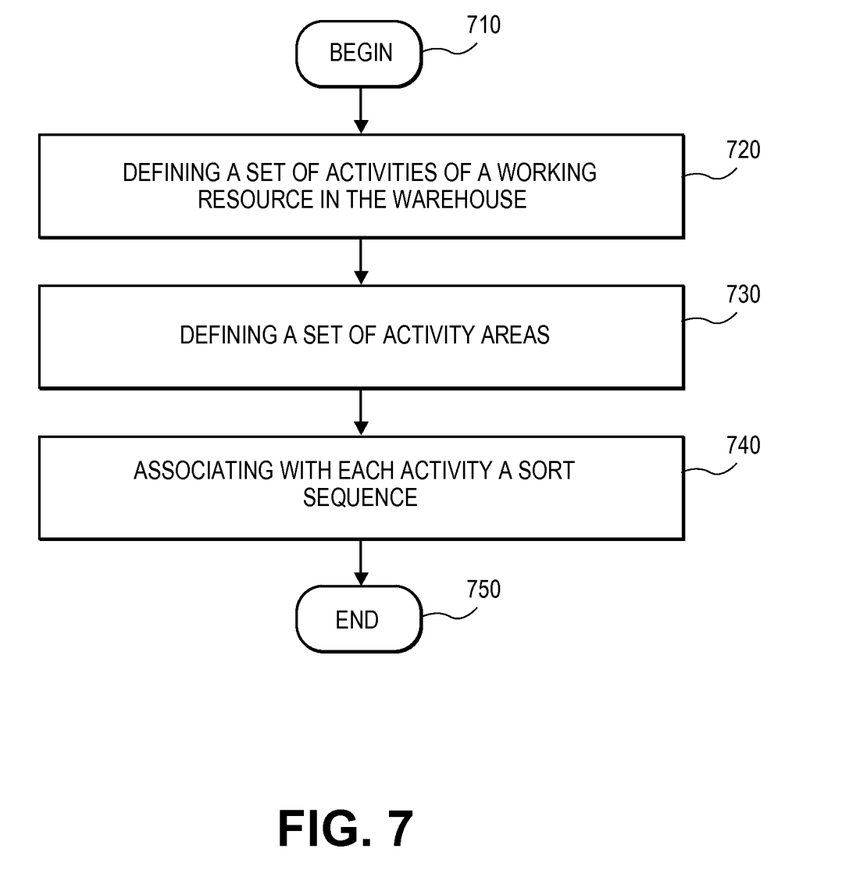
FIG. 7 illustrates a flow diagram of a second embodiment of the invention.

FIG. 7 illustrates the flowchart of the inventive method of organizing a warehouse. The method starts with step 710.

Then, a set of activities of a working resource in the warehouse is defined, see step 720.

In the next step, a set of activity areas is defined. Each activity area comprises a number of storage bins of the warehouse, see step 730.

Then, with each activity a sort sequence is associated, see step 740. The sort sequence defines a path through an activity area the working resource has to follow when accessing the bins.

The method ends with step 750.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments are in the scope of the following claims.

The invention claimed is:

1. A method of path planning for a working resource to access one or more of a plurality of storage bins in a warehouse, the warehouse comprising the plurality of storage bins, the warehouse being divided into a set of activity areas, each activity area in the set of activity areas being a separate area from any other activity area in the set of activity areas, and each activity area in the set of activity areas comprising a number of storage bins of the warehouse, the method comprising:
    selecting one out of a set of activities of the working resource in the warehouse;
    selecting one out of the set of activity areas, wherein the one or more storage bins is located within the selected activity area;
    selecting, by a computer, a first segment of a path, the first segment going through the warehouse between the selected activity area and a second activity area in the set of activity areas, wherein the first segment does not go within the selected activity area; and
    optimizing, by the computer, the path within the selected activity area by selecting a sort sequence based on the selected activity, the sort sequence defining a second segment of the path, the second segment extending the path to go within the selected activity area to the one or more storage bins, wherein the working resource has to follow the path when accessing the one or more storage bins.

2. The method of claim 1, wherein the second segment of the path is a non-linear route through the selected activity area.

3. A method of organizing a warehouse, the warehouse comprising a plurality of storage bins for storing goods, the method comprising:
    defining a set of activities of a working resource in the warehouse;
    dividing the warehouse into a set of activity areas, each activity area in the set of activity areas being a separate area from any other activity area in the set of activity areas, and each activity area in the set of activity areas comprising a number of the storage bins from the plurality of storage bins of the warehouse;
    defining first segment of a path, the first segment going through the warehouse between a first activity area in the set of activity areas and a second activity area in the set of activity areas, wherein the first segment does not go within the first activity area; and
    associating, by a computer, with each activity in the set of activities a sort sequence, the sort sequence defining a second segment of the path, the second segment extending the path to go within the first activity area in the set of activity areas, wherein the working resource must follow the path when accessing the plurality of storage bins.

4. The method of claim 3, wherein each activity in the set activities is categorized into picking, putting-away, counting goods stored in the plurality of storage bins, and replenishment of goods.

5. The method of claim 4, wherein each of the picking, putting-away, counting, and replenishment categories are further divided into sub-categories according to predefined criteria and each activity in the set activities is further categorized into one of the sub-categories.

6. The method of claim 5, wherein the predefined criteria are at least one of time, daytime, and nighttime.

7. The method of claim 3, wherein each of the plurality of storage bins is defined by at least one of aisle, stack, level, sub-division, and depth.

8. The method of claim 3, further comprising:
    associating position coordinates to each of the plurality of storage bins.

9. The method of claim 8, further comprising:
    determining a path length on the basis of the coordinates associated with the plurality of storage bins.

10. The method of claim 3, further comprising:
    selecting, for each activity area in the set of activity areas, one or more ranges of the plurality of storage bins according to a number of predefined attributes.

11. The method of claim 10, wherein the predefined attributes comprise location of the plurality of storage bins in the warehouse and storage types of the plurality of storage bins.

12. The method of claim 3, further comprising:
    assigning a start point and an end point to each activity area in the set of activity areas.

13. The method of one claim 3, wherein the sort sequence comprises:
a picking mode.

14. The method of claim 13, wherein the picking mode comprises one of picking only even numbered storage bins, picking only odd numbered storage bins, alternatingly picking even then odd numbered storage bins, and alternatingly picking odd then even numbered storage bins.

15. The method of claim 10, further comprising:
a rank associated with each of the one or more ranges, wherein the ranks indicate which ranges the working resource is to arrive at first while traversing the path.

16. The method of claim 3, wherein definitions of the set of activity areas are independent from the sort sequence.

17. A non-transitory machine readable medium having instructions therein that when executed by the machine cause the machine to:

define a set of activities of a working resource in a warehouse;

divide the warehouse into a set of activity areas, each activity area in the set of activity areas being a separate area from any other activity area in the set of activity areas, and each activity area comprising a number of storage bins of the warehouse;

define a first segment of a path, the first segment going through the warehouse between a first activity area in the set of activity areas and a second activity area in the set of activity areas, wherein the first segment does not go within the first activity area; and associate with each activity in the set of activities a sort sequence, the sort sequence defining a second segment of the path, the second segment extending the path to go within the first activity area in the set of activity areas, wherein the working resource must follow the path when accessing the number of storage bins.

* * * * *